Nov. 11, 1930.  A. G. NORTON  1,781,554
LUBRICATOR
Filed Oct. 1, 1928
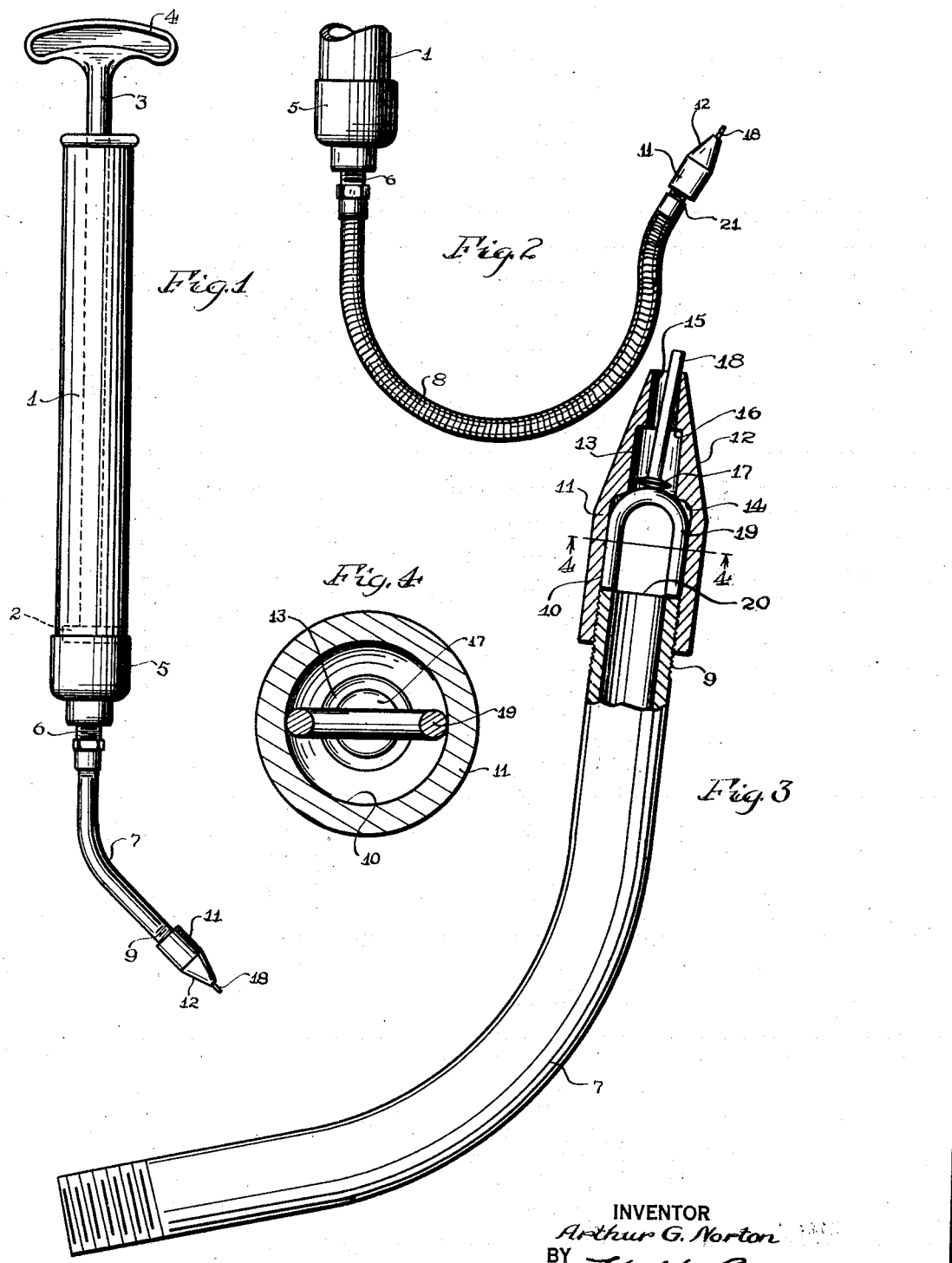
INVENTOR
Arthur G. Norton
BY
his ATTORNEY Patented Nov. 11, 1930

1,781,554

UNITED STATES PATENT OFFICE

ARTHUR G. NORTON, OF HOLLEY, NEW YORK, ASSIGNOR TO ALERT PRODUCTS, INC., OF ROCHESTER, NEW YORK, A CORPORATION OF NEW YORK

LUBRICATOR

Application filed October 1, 1928. Serial No. 309,543.

The present invention relates to lubricators and more particularly to the type in which a conductor for the lubricator is provided with a discharge through which the lubricant flows, said discharge being controlled by a valve which normally holds the lubricant against flowing through the discharge but which may be displaced by contact with the part to be lubricated for the purpose of permitting the flow of the lubricant. An object of this invention is to provide a novel and inexpensive mounting for the valve. A further object of the invention is to provide a novel means for holding the valve member in the discharge nozzle.

To these and other ends, the invention consists of certain parts and combinations of parts, all of which will be hereinafter described: the novel features being pointed out in the appended claims.

In the drawings:

Fig. 1 is a side view of the lubricator constructed in accordance with this invention;

Fig. 2 is a fragmentary side view of another embodiment of the invention;

Fig. 3 shows the conductor tube of Fig. 1 detached from the lubricant container and having the discharge end thereof in longitudinal section;

Fig. 4 is a section on the line 4—4, Fig. 3.

In the illustrated embodiment of the invention, 1 indicates a container in the form of a cylinder provided with suitable expelling means, in this instance, in the form of a piston 2 of any construction operating in the cylinder and having a piston rod 3 extended therefrom through the upper end of the cylinder and provided with a grip 4 through which the piston may be moved in either direction. To the lower end 5 of the cylinder a conductor tube may be detachably secured by couplings 6. The conductor tube may either be in the form of a rigid tube 7 or a flexible tube 8. When the rigid tube 7 is employed, the latter is preferably externally threaded at its outer end 9 to fit within a longitudinally extending bore 10 of a discharge nozzle 11.

The discharge nozzle, in this instance, preferably has its outer end tapering at 12 and communicating with the bore 10 is an intermediate bore 13 which is separated from the innermost bore 10 by an annular shoulder or abutment 14. The intermediate bore 13 communicates with an outermost or discharge bore 15 from which it is separated by an annular shoulder or seat 16. Within the bore 13 is a valve member 17 slightly less in diameter than the bore 13 so that the lubricant may pass about the same to the outermost bore 15. From this valve member extends a stem 18, this stem being less in diameter than the outermost bore and projecting through the bore 15 and beyond the end of the nozzle. When the valve member is in closed position, it seats against the seat 16 and is held in this position by gravity and the pressure of the material in the conductor tube. Opening of the valve is produced by pressure against the outer end of the stem. This construction is particularly designed for lubricant cups and other pockets, the tapered end of the nozzle fitting in the cup and engaging the upper edge of the latter while the valve stem 18 engages the bottom of the cup to displace the valve 17 inwardly.

The retainment of the valve member 17 in the valve chamber or bore 13 is effected, in this instance, by a substantially U shaped member 19. The connecting portion of the two arms of the U shaped member acts as a stop for the valve 17 and also seats against the shoulder 14. This U shaped member is held to this seat by the extreme end 20 of the conductor tube engaging the ends of the arms of the two U shaped members. When a flexible tube such as 8 is employed, the latter has a screw threaded nipple 21 which engages in the bore 10 and cooperates with the ends of the arms of the retainer 19.

Liquid lubricant may be drawn into the container by pulling outwardly on the piston 2.

What I claim as my invention and desire to secure by Letters Patent is:

1. A valve for lubricators comprising a nozzle having a tapered end provided with three bores of three different diameters, the smallest being at the discharge of the nozzle and the largest being at the opposite end, and two internal shoulders being provided, one between the intermediate bore and the smaller bore and the other between the intermediate bore and the larger bore, a conductor fitted in the larger bore and having its end spaced from the adjacent shoulder, a valve member freely movable in the intermediate bore to cooperate with the shoulder between the intermediate bore and the smaller bore to close the passage through the nozzle, a valve operator projecting from the valve through and from the smaller bore beyond the tapered end so that the valve member may be moved away from its seat, and a stop for the valve member held between the conductor and the shoulder between the intermediate and the larger bore, said stop extending across the passage through the nozzle to engage the valve member to confine the latter to the intermediate bore, space being provided on opposite sides of the valve member to permit a flow into the conductor from the smaller bore.

2. A valve for lubricators comprising a nozzle provided with a valve chamber, and passages leading toward and from the chamber, the passage leading from the chamber being smaller in diameter than the chamber, a valve member freely movable in the chamber, a valve operator projecting from the valve member through and from the passage leading from the chamber, and a stop bridging the intake to the valve chamber limiting the free movement of the valve member and providing a passage permitting a flow past the valve from the valve chamber.

3. A valve for lubricators comprising a nozzle provided with three bores of three different diameters, the smallest being at the discharge of the nozzle and the largest being at the opposite end, and two internal shoulders being provided, one between the intermediate bore and the smallest bore and the other between the intermediate bore and the largest bore, a conductor fitted in the largest bore and having its end spaced from the adjacent shoulder, a valve member freely movable in the intermediate bore to cooperate with the shoulder between the intermediate bore and the smallest bore to close the passage through the nozzle, a valve operator projecting from the valve through and from the smallest bore so that the valve member may be moved away from its seat, and a U shaped stop for the valve member held between the conductor and the shoulder between the intermediate and the larger bore, said stop having the connecting portion between its two arms extending across the passageway through the nozzle to engage the valve member to confine the latter to the intermediate bore and the arms of the U shaped stop lying in the largest bore and engaging at their ends the end of the conductor so as to be firmly held against movement.

ARTHUR G. NORTON.